US 7,685,378 B2

(12) United States Patent
Arakawa et al.

(10) Patent No.: US 7,685,378 B2
(45) Date of Patent: Mar. 23, 2010

(54) METHODS AND APPARATUS FOR ADJUSTING A JOURNAL AREA FOR CONTINUOUS DATA PROTECTION

(75) Inventors: Hiroshi Arakawa, Sunnyvale, CA (US); Akira Yamamoto, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 458 days.

(21) Appl. No.: 11/706,242

(22) Filed: Feb. 15, 2007

(65) Prior Publication Data

US 2008/0201391 A1 Aug. 21, 2008

(51) Int. Cl.
*G06F 12/00* (2006.01)
(52) U.S. Cl. .................. 711/154; 711/156; 711/170; 707/205; 714/6; 714/15; 714/20
(58) Field of Classification Search .......... 711/154, 711/156, 170; 707/205; 714/6, 15, 20
See application file for complete search history.

(56) References Cited

U.S. PATENT DOCUMENTS

| 7,036,043 | B2 * | 4/2006 | Martin et al. ............. 714/19 |
| 7,062,628 | B2 | 6/2006 | Amano ................... 711/170 |
| 7,340,645 | B1 * | 3/2008 | Martin et al. ............. 714/15 |
| 7,398,422 | B2 * | 7/2008 | Amano et al. ............ 714/19 |
| 2003/0135704 | A1 * | 7/2003 | Martin ................... 711/162 |
| 2004/0162958 | A1 | 8/2004 | Kano et al. ............... 711/170 |
| 2004/0268067 | A1 | 12/2004 | Yamagami ............... 711/159 |
| 2007/0028139 | A1 | 2/2007 | Wahl et al. ................ 714/6 |
| 2007/0271422 | A1 * | 11/2007 | Osaki ..................... 711/154 |
| 2007/0294568 | A1 * | 12/2007 | Kanda et al. .............. 714/6 |

FOREIGN PATENT DOCUMENTS

EP 1619594 1/2006

OTHER PUBLICATIONS

European Search Report for European Patent Application No. 07254428.1-2224, dated Jul. 1, 2008.

* cited by examiner

*Primary Examiner*—Stephen C Elmore
(74) *Attorney, Agent, or Firm*—Mattingly & Malur, P.C.

(57) ABSTRACT

In a storage system implementing journaling for data backup and restore, users are able to easily determine information regarding amounts journal data generated over specified periods of time. Flexible and automatic adjustment of the journal area is enabled by providing the user with the information on the relationships between the amounts of journal data generated over periods of time. Also dynamic allocation of storage capacity from free space may be applied to the journal volume on an as-needed basis, and may be used to minimize the size of the journal volume when certain journal entries are determined to be no longer needed. Thus, users are able to determine an appropriate size of a journal area in accordance with requirements for predetermined preservation periods for backup data. Thereby, management of the journal area is simplified and the costs to manage the journal area are reduced.

20 Claims, 17 Drawing Sheets

| Consistency Group ID (2011) | Journal (JNL) Volume ID (2012) | Production Volume ID (2013) | Current Sequence Number (2014) | Status (2015) |
|---|---|---|---|---|
| 0 | 10 | 0, 2, 4 | 100 | Updating |
| 1 | 11, 12 | 1, 3, 5, 7 | 300 | Stop |
| : | | | | |

FIG. 3

| Prod. Vol. ID (2021) | Consist. Group ID (2022) | Base volume (2023) | | Snapshot (2024) | | | |
|---|---|---|---|---|---|---|---|
| | | Volume ID | Status | SS ID | Volume ID | Time | Sequence Number |
| 0 | 0 | 20 | Updating | 1 | 100 | 2006/10/11 8:30:12.130000 | 1000 |
| | | | | 2 | 201 | 2006/10/11 16:30:00.000000 | 2000 |
| | | | | 3 | 302 | 2006/10/12 0:30:09.060000 | 3000 |
| | | | | : | | | |
| 1 | 1 | 31 | Stop | 1 | 500 | 2006/10/11 0:00:00.000000 | 5000 |
| | | | | 2 | 602 | 2006/10/11 8:00:00.000000 | 6200 |
| | | | | 3 | 704 | 2006/10/11 16:00:00.000000 | 7500 |
| | | | | : | | | |
| : | | | | | | | |

FIG. 4

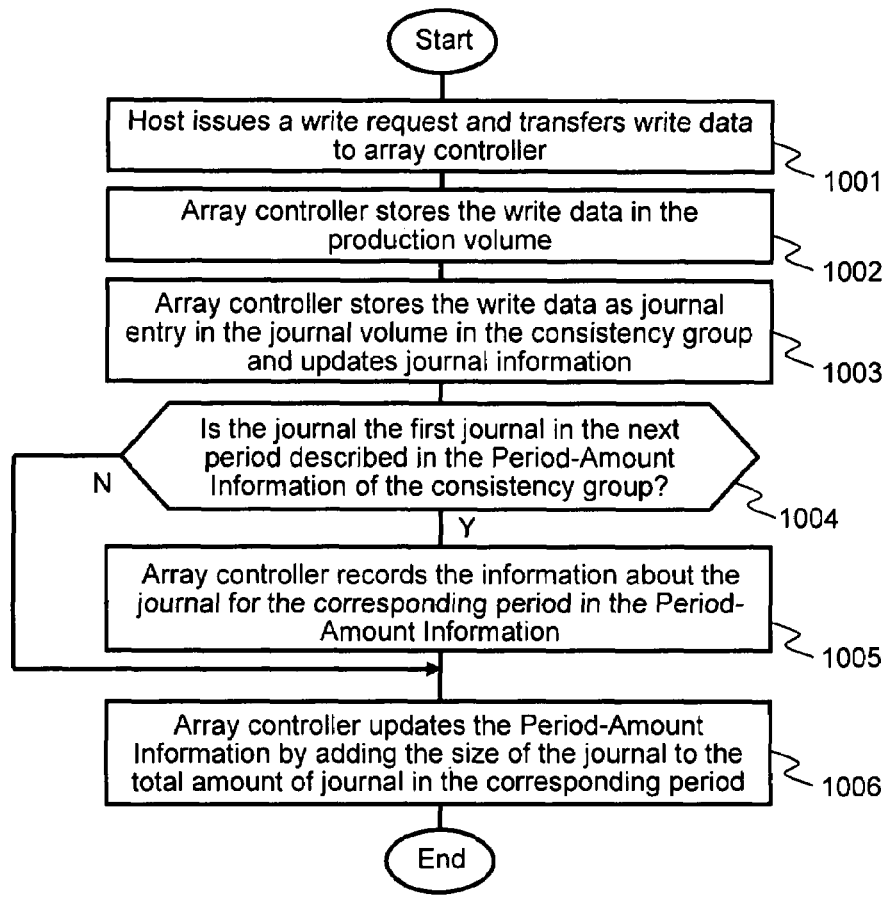

GENERATING JOURNAL

Start

1001 — Host issues a write request and transfers write data to array controller

1002 — Array controller stores the write data in the production volume

1003 — Array controller stores the write data as journal entry in the journal volume in the consistency group and updates journal information 1004 — Is the journal the first journal in the next period described in the Period-Amount Information of the consistency group?

1005 — (Y) Array controller records the information about the journal for the corresponding period in the Period-Amount Information 1006 — Array controller updates the Period-Amount Information by adding the size of the journal to the total amount of journal in the corresponding period

End

FIG. 9

| Consistency group ID | Oldest journal | | Latest journal | |
|---|---|---|---|---|
| | Sequence number | Time | Sequence number | Time |
| 0 | 1 | 2006/10/5 2:20:12.140000 | 4112 | 2006/10/12 4:34:16.120000 |
| 1 | 2000 | 2006/10/10 17:41:10.010000 | 8212 | 2006/10/12 20:30:22.120000 |
| : | | | | |

| Period Number (2041) | Start time of the period (2042) | Oldest sequence number in the period (2043) | Total size of journal generated in the period (2044) |
|---|---|---|---|
| 1 | 2006/10/5 0:0:0.000000 | 1100 | 40960 MB |
| 2 | 2006/10/6 0:0:0.000000 | 2500 | 94208 MB |
| 3 | 2006/10/7 0:0:0.000000 | 3000 | 126976 MB |
| 4 | 2006/10/8 0:0:0.000000 | 4200 | 172032 MB |
| 5 | 2006/10/9 0:0:0.000000 | 4900 | 206848 MB |
| 6 | 2006/10/10 0:0:0.000000 | 5500 | 233472 MB |
| 7 | 2006/10/11 0:0:0.000000 | Not recorded yet | Not recorded yet |
| 8 | 2006/10/12 0:0:0.000000 | Not recorded yet | Not recorded yet |
| : | : | | |

204

JOURNAL VOLUME

| Volume ID (2051) | Segment ID (2052) | Assigned (2053) | Chunk ID (2054) |
|---|---|---|---|
| 0 | 0 | Yes | 56 |
|   | 1 | No | - |
|   | 2 | Yes | 29 |
|   | : |   |   |
| 1 | 0 | Yes | 77 |
|   | 1 | Yes | 90 |
|   | 2 | No | - |
|   | : |   |   |
| : |   |   |   |

FIG. 17

| Chunk ID (2061) | Usage (2062) | Volume ID (2063) | Segment ID (2064) |
|---|---|---|---|
| 0 | In Use | 38 | 15 |
| 1 | In Use | 24 | 7 |
| 2 | Free | - | - |
| 3 | Free | - | - |
| : |   |   |   |

FIG. 18

METHODS AND APPARATUS FOR ADJUSTING A JOURNAL AREA FOR CONTINUOUS DATA PROTECTION

BACKGROUND OF THE INVENTION

1. Field of the Invention

The present invention relates generally to storage systems and to backup and recovery of data.

2. Description of Related Art

A conventional method for achieving backup and recovery of data in storage systems is to backup the data periodically (e.g., once a day) from the storage system to a backup media, such as magnetic tapes. In creating the backup data, a snapshot of a storage area (e.g., a point-in-time copy of a volume) is often used to obtain data with consistency. That is, the data to be backed up is read from a snapshot volume (or a mirror image volume that has been split from a primary volume), and copied to the backup media. Several methods to provide a snapshot of a storage area logically or physically are well known in the prior art for storage systems. When it is necessary for data to be restored, the data saved to the backup media is read from the backup media, and may be written to a new storage area (e.g., a new volume) in the same storage system, or to a different storage system, to enable access to the backed-up data.

However, with the above method, it is only possible to restore the image of the data at the particular point in time at which the snapshot was taken. Thus, restoring data from backup data taken only periodically may result in a loss of some amount of updates to the original data because there is a difference between the saved back up data and the data that is actually desired to be restored, such as the current data. Further, for example, if the latest backup data has incorrect or corrupted actual data, it is necessary to use older backup data, which results in even larger disparities in data correctness.

Recently, some storage systems have been configured with a capability of journaling data updates into a journal as the data updates occur, and then, when necessary, restoring data using the journal in a technology that is sometimes referred to as "continuous data protection" (CDP). In a storage system having this capability, all updates for a storage area are recorded as a journal, and the data at an arbitrary point in time can be restored by using the journal. In this journaling and restoring technique, point-in-time snapshots may also be used. That is, besides the journal, snapshots of the storage area may be maintained at predetermined intervals, and restoring the data at a desired arbitrary point in time is achieved by applying the data of the journal to one of the snapshots up to the specified arbitrary point in time at which restore is desired. This technology is disclosed in detail in US Patent Application Publication Number US2004/0268067A1, to K. Yamagami, filed Jun. 26, 2003, the disclosure of which is incorporated herein by reference.

In the system with journaling capability discussed above, a substantial amount of storage area (storage capacity) may be required to store the journal. Maintaining excessive storage capacity dedicated to storing the journal can increase the total cost of ownership for the system. Thus, a fundamental problem with current CDP technology is that maintaining large storage areas dedicated to the storing of journal data increases the total cost of ownership for such storage systems. Therefore there is a need for methods and an apparatus to automatically adjust and attempt to minimize the amount of storage area dedicated to storing of journals. US Patent Application Publication Number US2004/0162958A1, to Kano et al., filed Feb. 23, 2004, the disclosure of which is incorporated herein by reference, discloses automated online capacity expansion for storage devices. However, the prior art does not address or provide a solution to the problem discussed above.

BRIEF SUMMARY OF THE INVENTION

The invention enables users to determine an appropriate size of a journal area in accordance with specified requirements for retention periods for backup data. The invention also provides users with a simplified control means to manage the journal area, and reduces the cost of managing the journal area. This invention includes methods and means for users to determine a relation between the amounts (sizes) of journals and periods of journals. With these means, users can determine appropriate sizes of journal areas to meet their specified requirements for preservation periods of backup data. The invention also discloses methods to realize simplified, flexible and automatic adjustment of journal areas having a thin provisioning capability so as to achieve dynamic allocation of journal storage areas from free space on an as-needed basis. These and other features and advantages of the present invention will become apparent to those of ordinary skill in the art in view of the following detailed description of the preferred embodiments.

BRIEF DESCRIPTION OF THE DRAWINGS

The accompanying drawings, in conjunction with the general description given above, and the detailed description of the preferred embodiments given below, serve to illustrate and explain the principles of the preferred embodiments of the best mode of the invention presently contemplated.

FIG. 3 illustrates consistency group information utilized according to the invention.

FIG. 4 illustrates volume information utilized according the invention.

FIG. 9 illustrates a process flow of generating a journal.

FIG. 10 illustrates an example of journal information maintained according to the invention.

FIG. 17 illustrates an example of chunk mapping information.

FIG. 18 illustrates an example of chunk usage information.

DETAILED DESCRIPTION OF THE INVENTION

Figure 1:
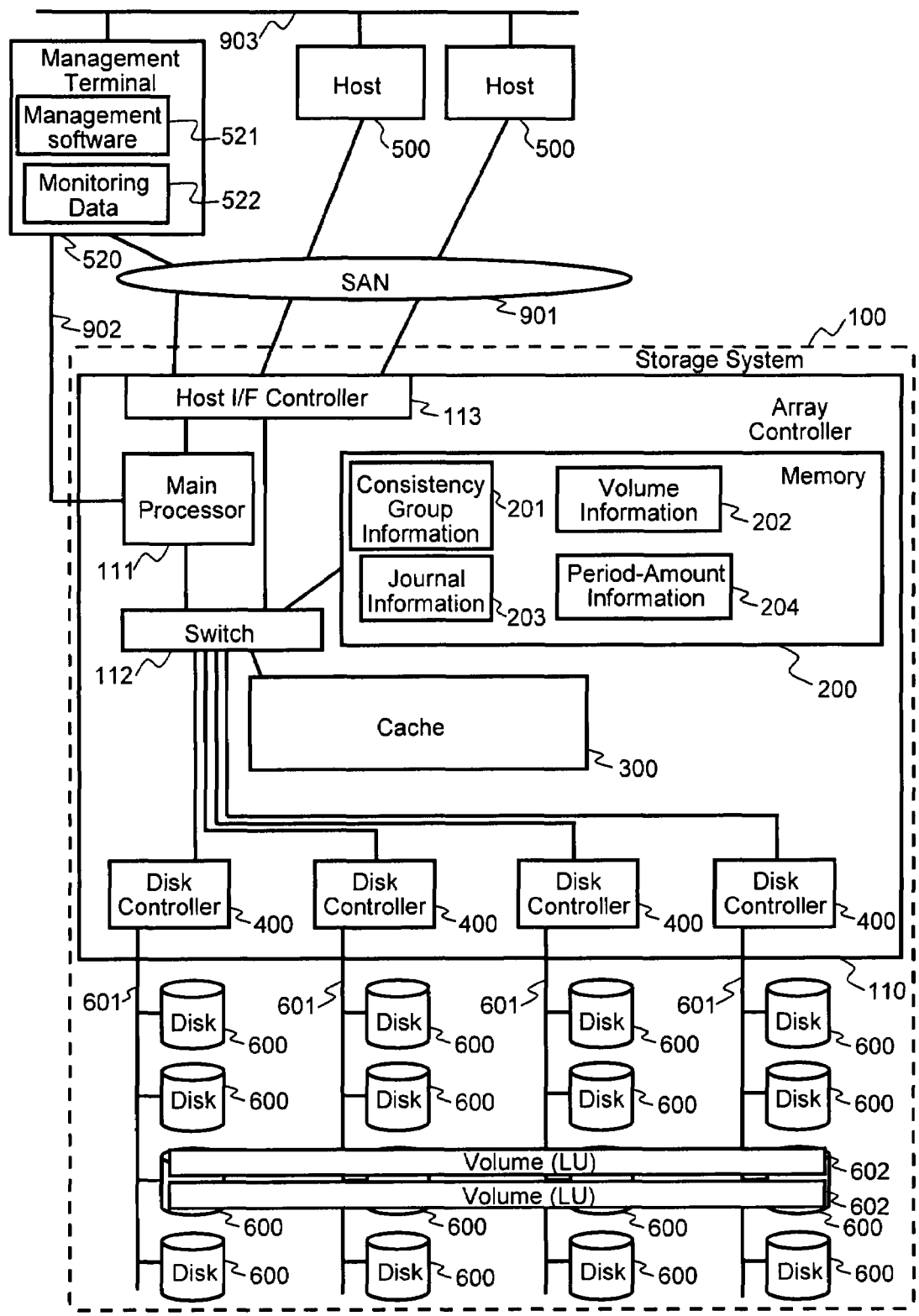
FIG. 1 illustrates an example of a system and hardware configuration in which the method and apparatus of the invention may be applied.

In the following detailed description of the invention, reference is made to the accompanying drawings which form a part of the disclosure, and, in which are shown by way of illustration, and not of limitation, specific embodiments by which the invention may be practiced. In the drawings, like numerals describe substantially similar components throughout the several views. Further, the drawings, the foregoing discussion, and following description are exemplary and explanatory only, and are not intended to limit the scope of the invention or this application in any manner.

In the first embodiments, the system comprises host computers, a management terminal and a storage system having a journaling capability, as described above. The storage system maintains information about an amount (size) of a journal and a time (period) of journal. In response to an inquiry from the management terminal, the storage system provides the information about the size and period of the journal. Thus, the management terminal can monitor the relation between the sizes and the periods of journals that are generated and stored in the storage system. The management terminal also presents the relation to users. By using this information, the users can determine the appropriate sizes of journal areas and can provide instructions for adjustment of the journal areas to suitable sizes.

In the second embodiments and the third embodiments, storage areas in the storage system are divided into multiple fixed-size areas (i.e., storage chunks), and the storage system performs dynamic allocation of the chunks (i.e., thin provisioning). The storage system allocates the chunks to the journal areas on demand and releases the chunks from the journal areas based on users' policy for preservation periods of the journals.

First Embodiments—System Configuration

FIG. 1 describes and exemplary system and hardware configuration of an information system under which first embodiments of the invention may be practiced. A storage system 100 includes an array controller 110 for receiving data access commands from one or more host computers 500 via a network 901. Network 901 may be a storage area network (SAN), such as a Fibre Channel network, iSCSI(IP) or other network type or communications link enabling communications between hosts 500 and storage system 100.

Array controller 110 may include a main processor 111, a switch 112, one or more host interface (I/F) controllers 113, a system memory 200, a cache memory 300, and one or more disk controllers 400. Disk controllers 400 couple array controller 110 to one or more hard disk drives (HDDs) 600 via a backend path 601. Back end path 601 may be Fibre Channel, SATA, SAS, iSCSI(IP), or other suitable type of connection.

Main processor 111 performs various processes in array controller 100 to facilitate storing data to and retrieving data from HDDs 600. Additionally, to enable operation of the invention, memory 200 stores consistency group information 201, volume information 202, journal information 203, and period-amount information 204, each of which will be described in more detail below.

A management terminal 520 may be connected for communication with host interface 113 of array controller 100 via SAN 901. Hosts 500 and management terminal 520 may also be connected to each other for communication via a local area network (LAN) 903. Further, management terminal 520 may also be connected for communication with array controller 110 via an out-of-band network 902 (e.g., IP), separate from the SAN 901 to enable monitoring functions, and the like.

One or more logical volumes 602 (logical units) are provided by storage system 100 for storage of data received from hosts 500. Volumes 602 are provided using a concatenation of one or more physical storage areas in HDDs 600. Preferably volumes 602 are protected by storing parity code for the stored data (i.e., such as by a RAID configuration), and may include physical storage areas distributed across multiple HDDs 600 to provide data protection for the data stored to volumes 602. The volumes discussed below may each be of the type of volume 602 described here and as illustrated in FIG. 1. Further, while FIG. 1 illustrates an exemplary system arrangement for practicing the invention, other system and hardware arrangements will be apparent to those of skill in the art in light of the disclosed invention.

Basic Process of Journaling

Figure 2:
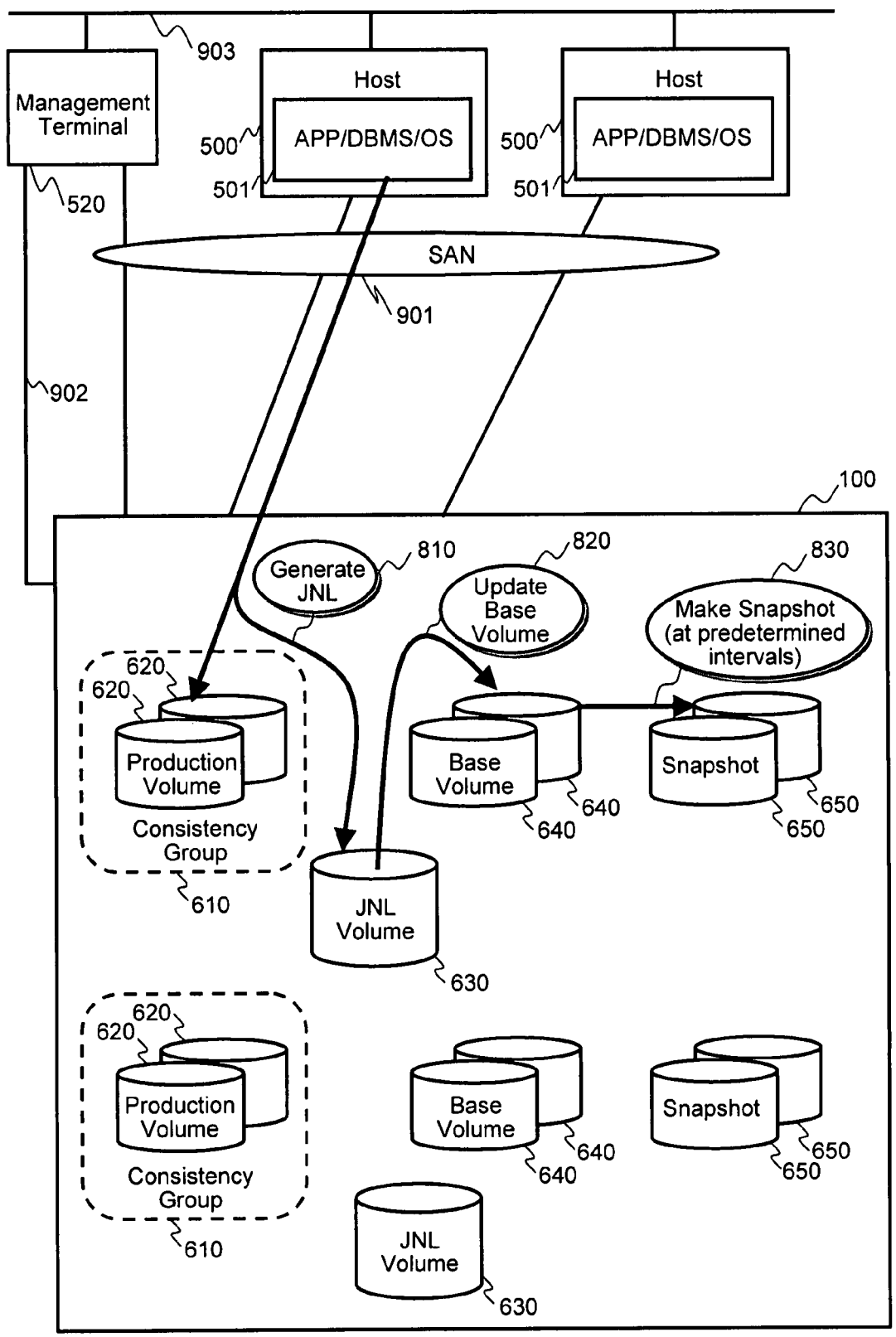
FIG. 2 illustrates an example of a basic process of journaling carried out in the configuration of FIG. 1.

FIG. 2 describes a basic process of journaling and snapshot generation carried out in the configuration set forth in FIG. 1. In FIG. 2, host 500 includes software 501, such as application software (APP), a database management system (DBMS) and operating system (OS) which generates data to be stored to a production volume 620. Software 501 stores data to production volumes 620 provided by storage system 100, such as through write commands. Storage system 100 also includes base volumes 640 that constitute a pair (i.e., a replica) with production volumes 620. When data protection is initiated for a production volume 620, a base volume 640 is created that is a replica of the data contained in the corresponding paired production volume 620. The base volume receives the same updates to data as are made to the production volume 620, in the manner described below.

One or more production volumes 620 constitute a consistency group 610. Each consistency group 610 includes one or more assigned journal volumes 630 upon which journal entries are recorded. A Generate Journal (JNL) Function 810 in storage system 100 obtains write data (update data) that is written to production volumes 620. The Generate Journal Function 810 duplicates the received update data as journal data, and assigns a sequence number (incremental number) to each journal data in write order (i.e. chronological order). The sequence number is generated for each consistency group 610, in other words, the journal data in a consistency group 610 has a unique sequence number for the consistency group 610. Then, Generate Journal Function 810 records the journal data and sequence number as a journal entry on journal volumes 630 that are assigned for the consistency group 610. The sequence number is recorded on metadata 634 described below.

FIG. 3 illustrates an example of consistency group information 201 maintained for each consistency group 610 according to the invention. Consistency group information 201 includes entries for consistency group ID 2011, journal volume ID 2012, production volume ID 2013, sequence number 2014 and status 2015. Thus, consistency group information 201 includes information about each consistency group and maintains the relations between production volumes 620 and journal volumes 630. Consistency group information 201 also records the current sequence number in each consistency group 610.

FIG. 4 illustrates an example of volume information 202 that is maintained for each production volume 620. Volume information 202 includes entries for production volume ID 2021, consistency group ID 2022, base volume information 2023, including volume ID and status, and snapshot information 2024, including snapshot ID, volume ID, point in time of a snapshot and sequence number for the snapshot. Thus, volume information 202 includes information about the relations between production volumes 620, base volumes 640 and snapshot volumes 650.

Figure 5:
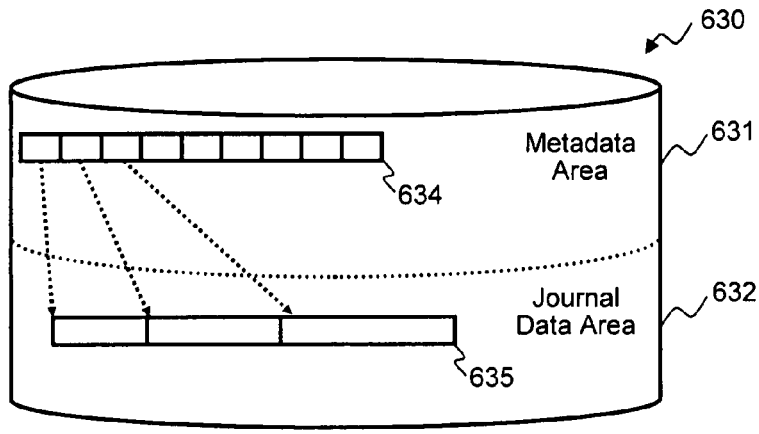
FIG. 5 illustrates a method of storing journal data in the journal volume.

FIG. 5 illustrates a method of storing journal entries in a journal volume 630. Journal volume 630 is divided into two areas: a metadata area 631 and a journal data area 632. Generate JNL Function 810 determines a location for storing the update data as journal data 635 in journal data area 632. Then, Generate JNL Function 810 generates information with a fixed length (metadata 634) for each journal entry 635, records the location of the journal data 635 on the metadata 634, and stores the metadata entry 634 in metadata area 631. Then, Generate JNL Function 810 also stores the update data to the location in journal data area 632 as journal data 635. Typically, the journal entries are stored sequentially into the journal volume 630 as the data updates are received from the host computers 500.

Figure 6:
FIG. 6 illustrates an example of contents of a metadata information according to the invention.

FIG. 6 illustrates an example of contents of a metadata entry 634 in journal volume 630. For example, metadata 634 may includes a consistency group field 6341, a sequential number field 6342, a time field 6343, a system ID for the journal volume field 6344, a volume ID of metadata field 6345, a location of metadata field 6346, a volume ID of journal data field 6347, a location of journal data field 6348, a system ID for the production volume field 6349, a production volume ID field 6350, a location in production volume field 6351, a system ID for the base volume field 6352, a base volume ID field 6353, a location in base volume field 6354, a data length field 6355, and a type field 6356. Thus, from the metadata 634, information about the journal entry 635 may be obtained, including sequence number and time of the journal entry, and also information about data length, location of the journal entry in the journal volume 630 and location of corresponding data in the production volume 620.

In FIG. 2, an Update Base Volume Function 820 in storage system 100 reads metadata, acquires journal data from journal volume 630, and updates base volume 640 with the journal data according to the sequence number. Additionally, a Make Snapshot Function 830 in storage system 100 obtains a snapshot 650 of each base volume 640 at predetermined point-in-time intervals, and updates snapshot information 2024 in volume information 202. As described in FIG. 4, volume information 202 has snapshot information 2024 about snapshot volumes 650. Make Snapshot Function 830 records time and sequence number of journal entries corresponding to snapshots 650 on volume information 202. Time stamps entered in time field 6342 of metadata 634 and recorded in volume information 202 are attached by storage controller 110 using the received time or attached by a host 500 using a write time.

Basic Process of Restoring Data with a Journal

Figure 7:
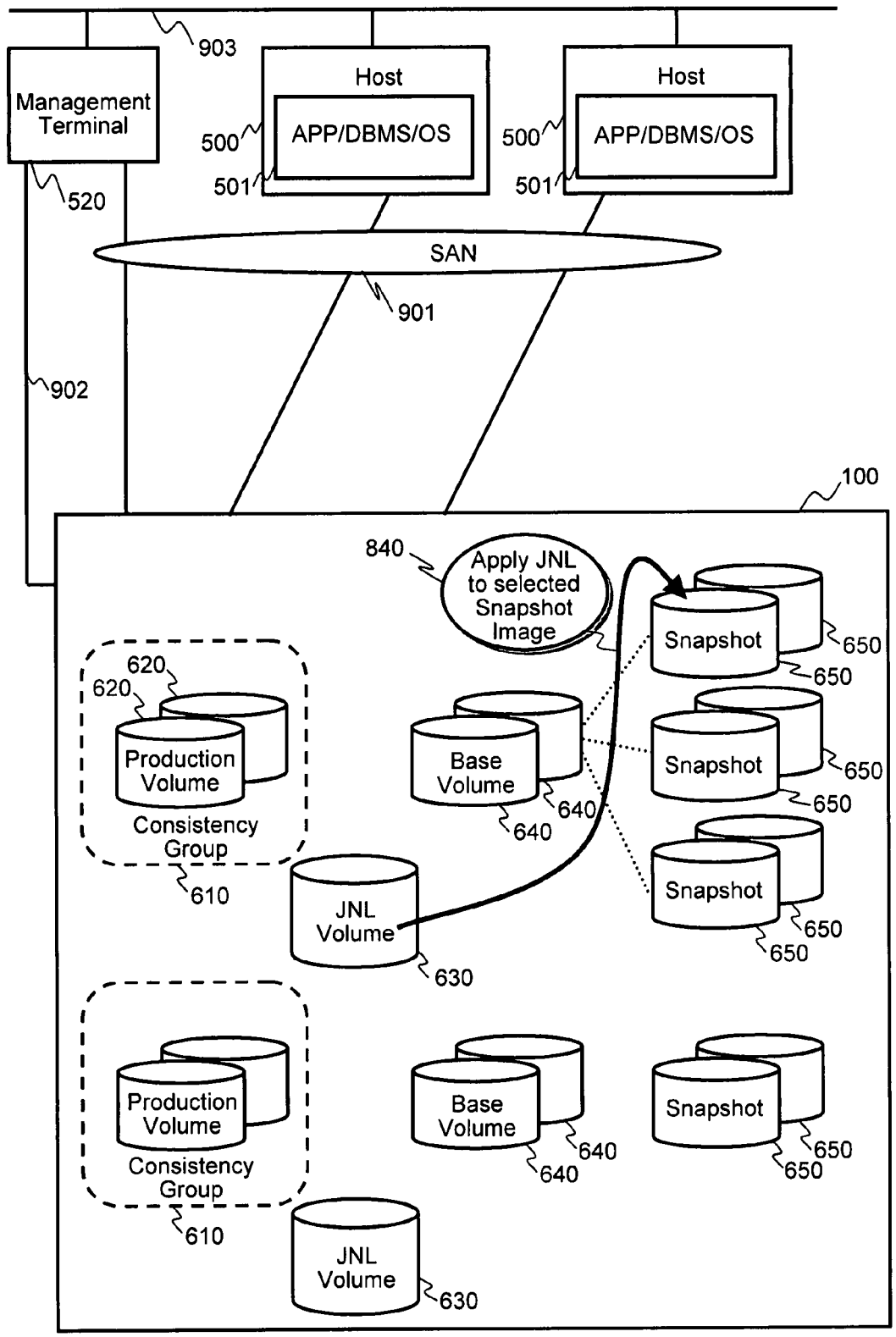
FIG. 7 illustrates a basic process of restoring data by using a journal.

FIG. 7 illustrates a basic process of restoring data by using the journal volume 630 and a snapshot volume 650. First, host 500 instructs a restore data operation by specifying a production volume 620 and by indicating a point in time to which the data is to be restored. According to the instruction including an indication of the data and the point in time, the storage system 100 uses an Apply Journal Function 840 to select a snapshot that contains the data before the specified point in time.

Figure 8:
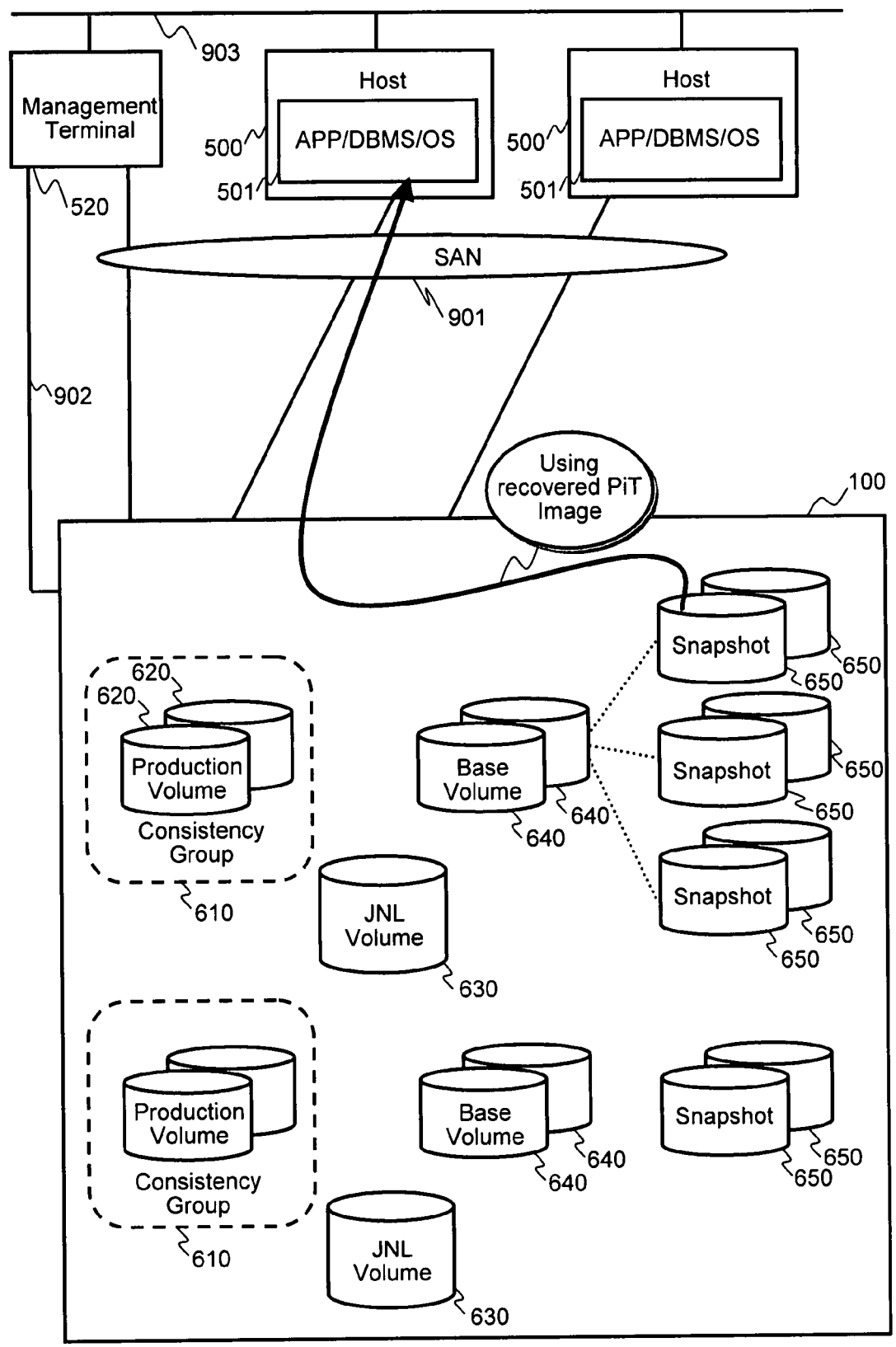
FIG. 8 illustrates a host able to use the recovered point in time image of the data.

The Apply Journal Function 840 then applies (writes) journal entries from the journal volume 630 corresponding to the selected snapshot volume 650. The journal entries are applied to the snapshot volume to update the snapshot volume to the specified point in time by applying sequentially journal entries starting with the journal entry immediately after the point in time of the snapshot up to the specified point in time and sequence number in the metadata 634. Preferably, the snapshot taken closest to the specified point in time should be selected for applying the journal entries so as to minimize the number of journal entries that must be applied to the snapshot. The Apply Journal Function 840 is able to recognize the journal entries to be applied by referring to volume information 202 and metadata 634. After completion of applying the journal entries to the selected snapshot volume 650, the Apply Journal Function 840 changes the status of the snapshot to make it accessible (i.e., read/write access is allowed). Then, as illustrated in FIG. 8, host 500 can use the recovered point-in-time (PiT) image of the data as the current production volume 620.

Process of Generating a Journal

FIG. 9 illustrates a process of generating a journal. The process includes steps 1001-1006, as described in detail below.

At step 1001, host 500 issues a write request and transfers write data to array controller 110 for storage of the write data to a targeted production volume 620.

At step 1002, array controller 110 stores the write data in the targeted production volume 620 in accordance with the write request.

At step 1003, array controller 110 also stores the write data as a journal entry in the appropriate journal volume 630. In the case of a consistency group 610, the write data would be stored as a journal entry in the journal volume 630 for the corresponding consistency group 610 that includes the targeted production volume 620. The metadata for the journal entry is also created and stored in the journal volume 630 at this step.

Also during step 1003, array controller 110 updates journal information 203 that is maintained in the memory 200. FIG. 10 illustrates an example of journal information 203. Journal information 203 includes a field for consistency group ID 2031, an oldest journal field 2032, and a latest journal field 2033, including sequence number and time for each. Information regarding the latest (newest) journal of a consistency group 610 is updated according sequence number and time stamp when a new journal entry is made for that consistency group. The journal entries between the oldest sequence number and the latest sequence number in journal information 203 indicate the current effective journal for each consistency group 610.

Figures 11, 13:
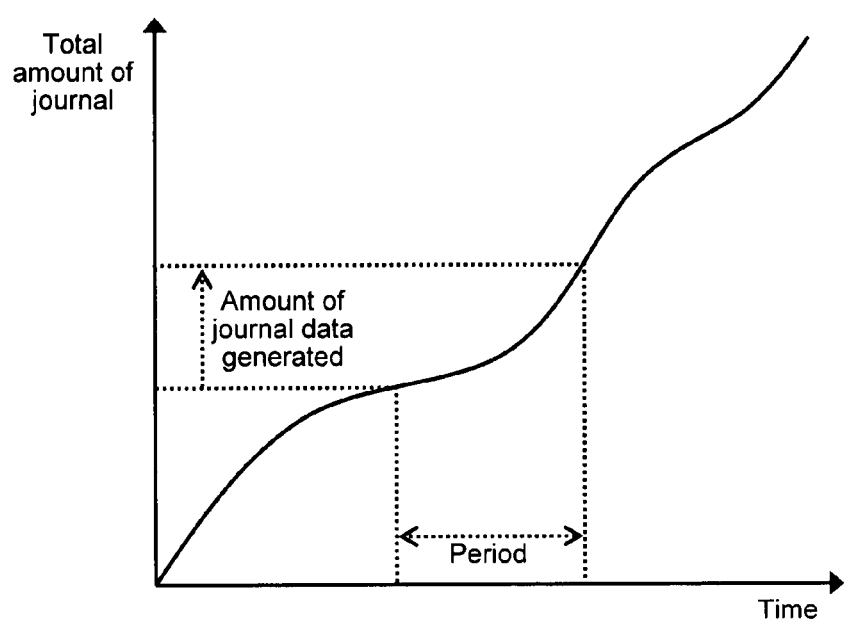
FIG. 11 illustrates an example of period-amount information maintained according to the invention.
FIG. 13 illustrates an example of a relation between the specified period and the amount of the journal.

At step 1004, array controller 110 determines the time of the journal and compares the determined time to a start time of a period defined in period-amount information 204 maintained in memory 200. FIG. 11 illustrates an example of period-amount information 204 maintained by array controller 110 for each consistency group 610. Period-amount information 204 includes a period number field 2041, a start time field 2042, an oldest sequence number field 2043 and a total size (amount) of journal generated field 2044. Thus, in period-amount information 204, periods are defined for each consistency group 610 according to intervals specified by users. Period-amount information 204 maintains the total size of the journals that are generated in each period in addition to information on the first journal entry of each period, such as sequence number of the journal entry.

When the time of the journal entry determined in step 1004 corresponds to a period of "not recorded yet" in period-amount information 204, then this means that a new time period has started, and this is the first journal entry for the next period. Thus, when the journal entry is the first journal entry of the period, the process proceeds to step 1005. However, when the time of the journal entry is not in the next period, the process skips to step 1006.

At step 1005, array controller 110 records the information about the journal entry for the corresponding period in period-amount information 204. In other words, in the embodiments illustrated, the sequence number of the journal entry is entered into the oldest sequence number field 2043 of period-amount information 204.

At step 1006, array controller 110 updates period-amount information 204 by adding the size of the journal entry to the total size of journal field 2044 in the corresponding period, and the process ends.

Operation and Process to Diminish Journal Area

Figure 12:
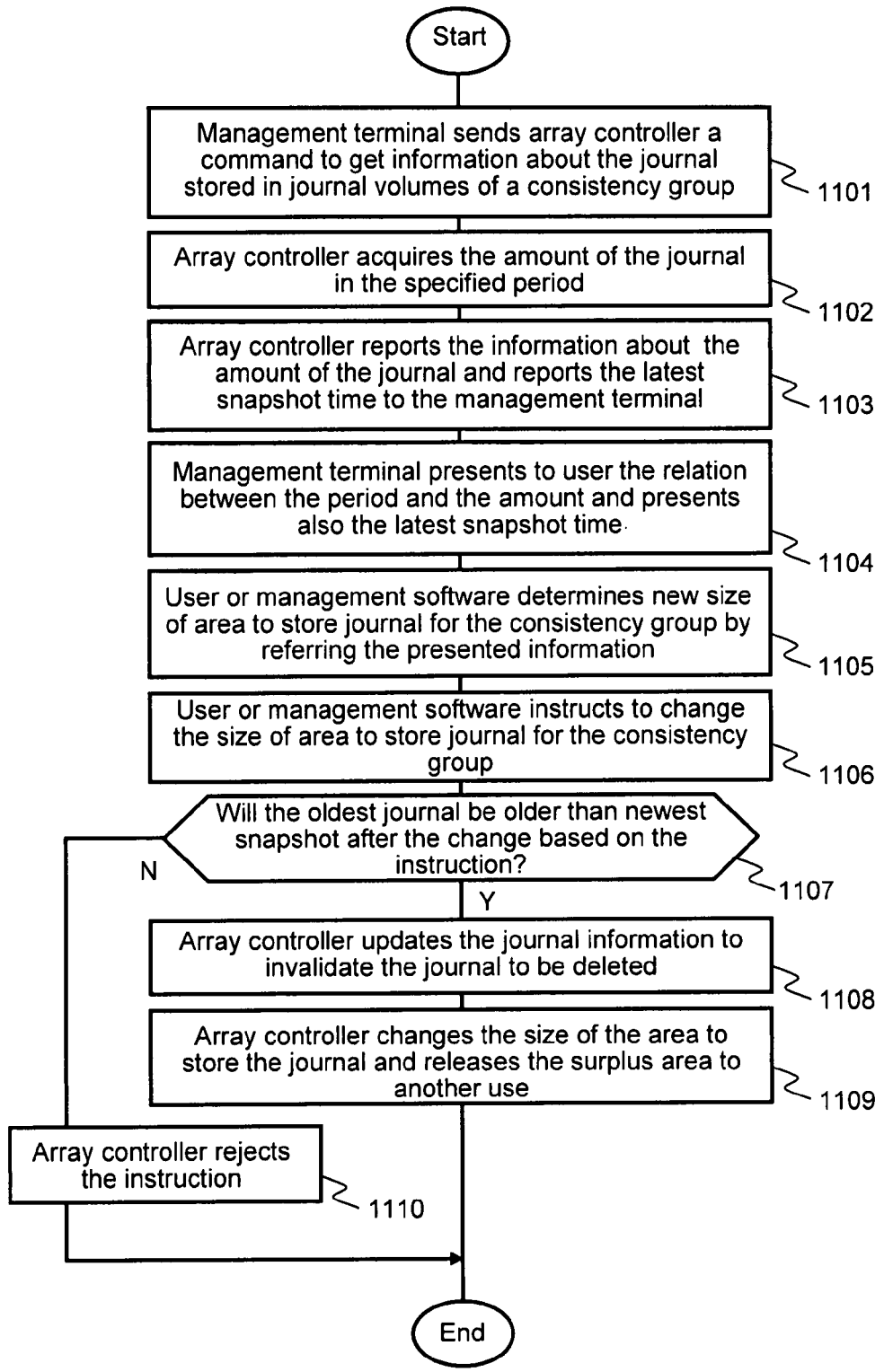
FIG. 12 illustrates a process to diminish a journal area under the invention.

FIG. 12 illustrates a process to diminish (minimize) the journal area. The process carried out includes steps 1101-1110, as described below.

At step 1101, management terminal 520 sends to array controller 110 a request to obtain information about the journal stored in journal volumes 630 of a consistency group 610, such as for a specified time period.

At step 1102, array controller 110 acquires the size of the journal generated in the specified consistency group 610 during the specified period. One method to acquire the amount of journal data generated is by referring to period-amount information 204 and calculating the size of the journal. Searching corresponding metadata and reading the data contained therein can be used as another method to acquire the size information over the specified time period.

At step 1103, array controller 110 reports the information about the size of the journal for the requested period, and may also report the latest snapshot time of the consistency group 610 to management terminal 520. The latest snapshot time may be obtained from the volume information 202.

At step 1104, management terminal 520 presents to users the relation between the requested period and the amount of journal data generated over the requested period. The latest snapshot time may also be presented.

FIG. 13 is an example of the relation between the specified time period and the amount of journal data generated over the specified time period. Management terminal 520 can display charts like this to users via a graphic user interface (GUI), as well as by just displaying the numerical data (values) of the amount of journal data and the time period.

At step 1105, a user or management software 521 on management terminal 520 determines a new size of a storage area to store the journal (i.e., a new size for journal volume 630) for the consistency group 610 by referring to the presented information described above.

At step 1106, a user or management software 521 instructs array controller 110 to change the size of the journal area for the consistency group 610. For reducing the size of the journal volume 630, this can entail the array controller 110 reducing the size of the journal volume by eliminating storage areas storing journal entries older than the latest snapshot. For increasing the size of the journal volume, additional physical storage space may be allocated.

At step 1107, array controller 110 inspects what the effect of the instructed change in the journal area size would have on the journal data already stored. If the oldest journal after the change would be older than the latest (newest) snapshot, the proposed change is acceptable, and the process proceeds to step 1108. However, if the oldest journal after the change would be newer than the latest snapshot, then the change is not acceptable, and the process proceeds to step 1110.

At step 1108, array controller 110 updates the information about the oldest journal in journal information 203 to invalidate the journal data to be deleted, so that the new oldest journal entry is the oldest journal entry remaining after the resizing.

At step 1109, array controller 110 changes the size of the journal area of the consistency group 610 and releases the surplus storage area containing journal entries older that the new oldest journal entry, so that the surplus storage area may be applied to another use. The size of the journal area may be reduced in several ways. Two examples of this include the following:

(1) Making a contiguous free (unused) area in the last part of journal volume 630 (volume 602) by copying (or moving) valid journal entries; or (2) Changing the configuration of the volumes 602 (i.e., by shrinking of the volumes 602).

At step 1110, array controller 110 rejects the instruction to change the journal area size because the restoring of data by applying journal entries to a snapshot would not be able to be performed if there would be no snapshot that is older than the oldest journal entry. Alternatively, rejection of the instruction due to time of the latest snapshot may be performed by management terminal 520 as a result of evaluation of the latest snapshot time received from the storage controller 110.

In addition to the dynamic changing of the journal area while keeping a part of the journal data, as mentioned above, reconfiguration may also be made from the initial state to achieve a change in the size of the journal area. In the case of such initial reconfiguration, inspection for existence of a snapshot is not required.

Continual Monitoring of Relation between the Amount and the Period of the Stored Journal Management terminal 520 can monitor the relation between the amount and time period of the stored journal data in each consistency group 610 by inquiring on a regular continual basis to array controller 110 regarding the relation between the amount and period of journal data in each journal volume. Management terminal 520 is able to store a log of the acquired information as monitoring data 522, and can display the acquired information to users. Users or management software 521 can use the acquired information for making various decisions, including determination an optimal size of the journal storage area.

Second Embodiments—System Configuration

Figure 14:
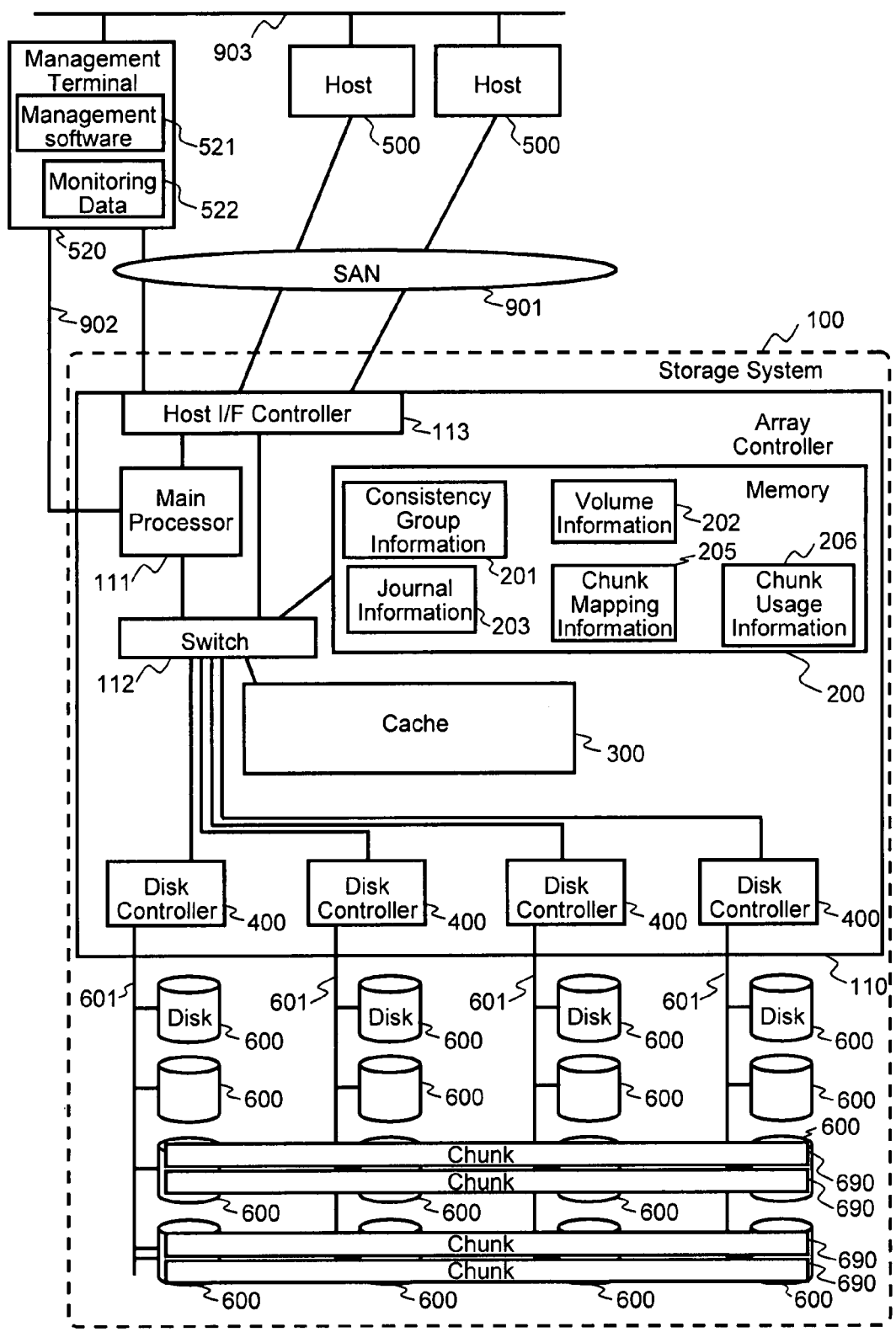
FIG. 14 illustrates a system configuration of the second embodiments of the invention.
Figure 15:
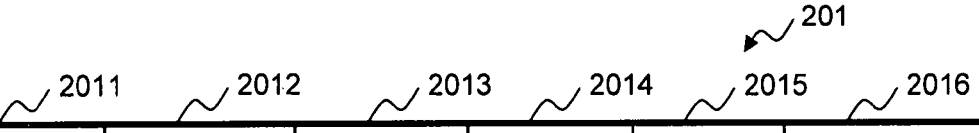
FIG. 15 illustrates consistency group information for the second embodiments.

FIG. 14 illustrates the system configuration of the second embodiments. The differences from the configuration of the first embodiments are that memory 200 includes chunk mapping information 205 and chunk usage information 206. In this configuration, storage areas provided by disks 600 are divided into a number of fixed-length storage area (i.e. chunks 690), and volumes (logical units) including journal volumes 630 are provided by allocating chunks of storage on demand. Moreover, in the second embodiments, as illustrated in FIG. 15, consistency group information 201 includes an additional preservation period field 2016, which retains information on a specified preservation period for journal data, as is discussed further below.

Figure 16:
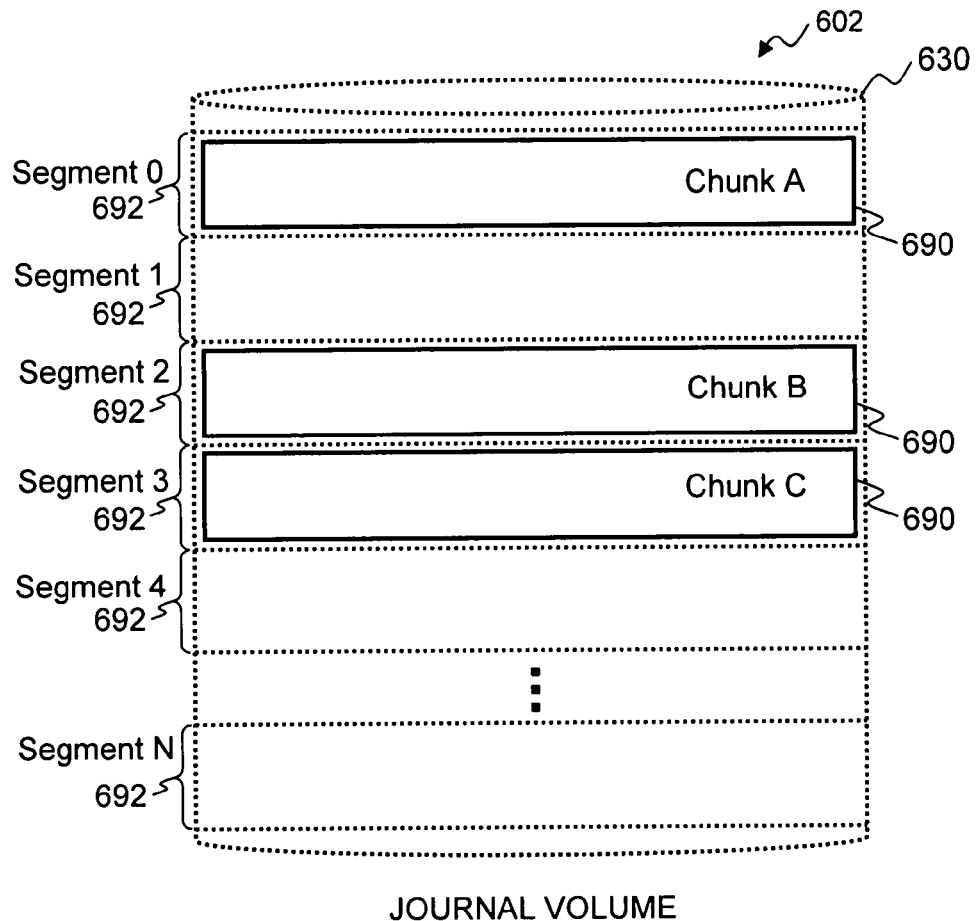
FIG. 16 illustrates a manner to provide volumes in the storage system.

FIG. 16 illustrates a manner to provide volumes 602 in the storage system 100 of the second embodiment. In FIG. 16, a journal volume 630 is constituted by multiple segments 692 virtually, and one chunk 690 is assigned to one segment 692 as physical storage area on an as-used basis. Thus, each logical volume 602 is composed of a plurality of logical segments 692, and each segment 692 of the volume has a segment size that is equal to the size of a chunk 690 of physical storage area. For example, as illustrated in FIG. 14, in one embodiment, each chunk 690 might be composed of physical storage space from four HDDs 600, such as 512 bytes on each HDD, so that the chunk size would be a storage capacity amount of 2048 bytes. The size of a segment 692 in such a configuration would preferably also be 2048 bytes. The segments 692 are typically numbered sequentially starting from zero to a maximum segment size, as illustrated in FIG. 16, while also being associated with logical block addresses for storage. Initially, no chunks or a predetermined small number of chunks might be allocated to the journal volume 630. When a write is made to an address in a segment of the journal volume that does not yet have a physical storage chunk allocated to it, the storage system allocates a chunk to the targeted segment.

To enable this dynamic chunk allocation functionality, array controller 110 uses chunk mapping information 205, as illustrated in FIG. 17, and chunk usage information 206, as illustrated in FIG. 18. FIG. 17 is an example of chunk mapping information 205, which may include a volume ID field 2051, a segment ID field 2052, an assigned/unassigned field 2053 and a chunk ID field 2054. Thus, chunk mapping information 205 maintains the mapping between chunks 690 and segments 692 of each volume. Status of assignment is 'No' in field 2053 if no chunk is assigned to the segment, and "Yes" when a chunk has been assigned. This information 205 can also be constructed as a list or a directory of each element to achieve faster searching capability.

FIG. 18 illustrates an example of chunk usage information 206 that includes a chunk ID field 2061, a usage field 2062, a volume ID field 2063 and a segment ID field 2064. The chunk usage information 206 enables the array controller 110 to quickly determine whether a chunk is used or not, and if the chunk is used, the volume and volume segment to which it is assigned. By using this information, array controller 110 is able to find free (unused) chunks in the process described below. This information also can be constructed as a list or a directory of each element to achieve faster searching capability.

Process of Generating a Journal

Figure 19:
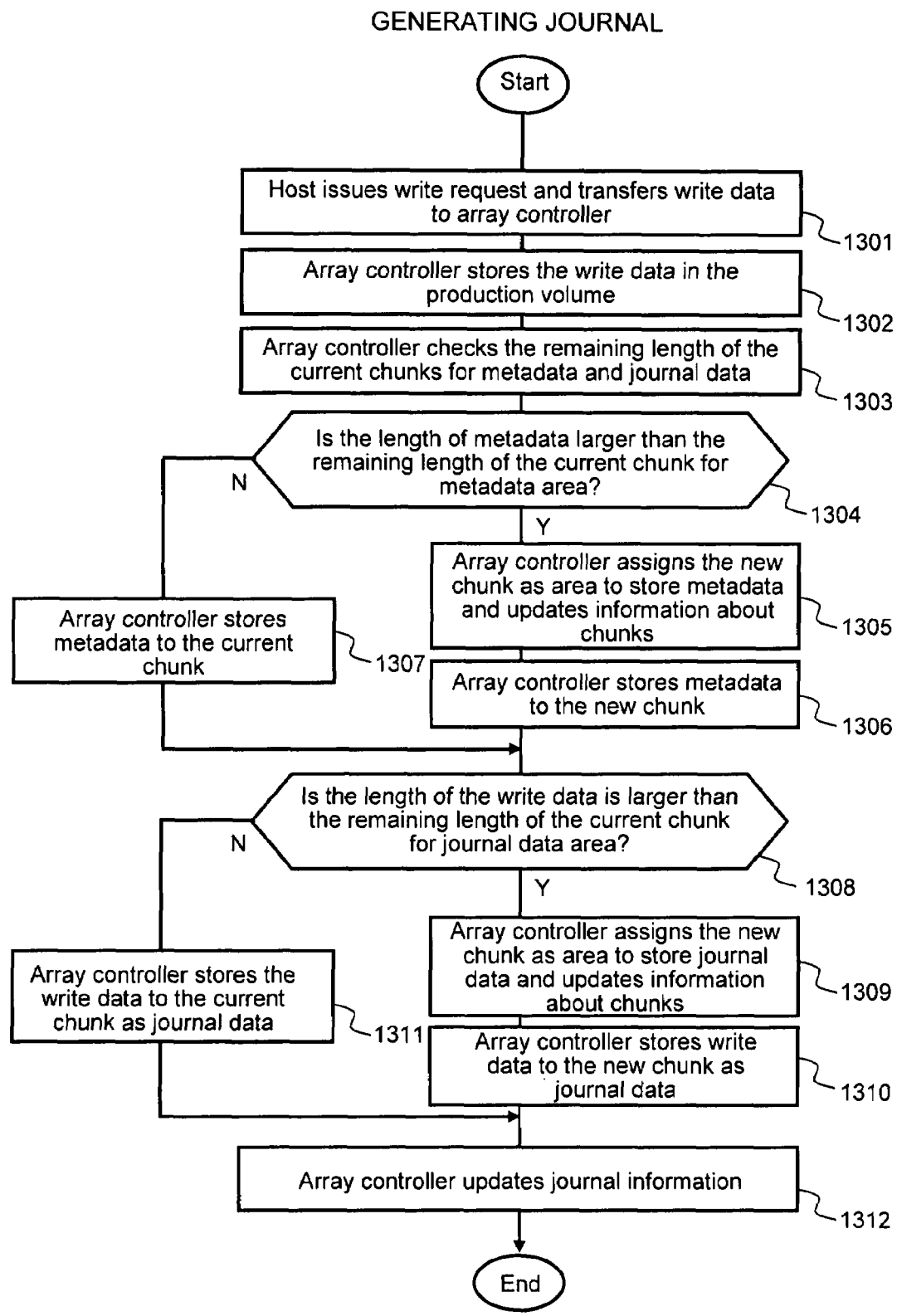
FIG. 19 illustrates a process of generating a journal.

FIG. 19 illustrates a process of generating a journal in the second embodiments. The process includes steps 1301-1312, as described in detail below.

At step 1301, host 500 issues a write request and transfers write data to array controller 110.

At step 1302, array controller 110 stores the write data in the targeted production volume 620 in accordance with the write request.

At step 1303, array controller 110 checks the remaining (unused) size of the current chunks (or segments) for metadata and for journal data in the journal volume 630.

At step 1304, as a result of the inspection in step 1303, if the size of metadata of the new journal entry is larger than the remaining size of the current chunk (or segment) for the metadata area 631, the process proceeds to step 1305. If not, the process proceeds to step 1307.

At step 1305, array controller 110 assigns a new chunk to a segment as an area to store metadata. The new chunk is assigned from free chunks located using chunk usage information 206, and when the chunk is assigned, the chunk mapping information 205 and chunk usage information 206 is updated.

At step 1306, array controller 110 stores the metadata to the new chunk.

At step 1307, since it was determined at step 1304 that sufficient storage capacity is already present for storing the metadata for the new journal entry, array controller 110 stores the metadata to the current chunk/segment.

At step 1308, as a result of the inspection in step 1303, if the size of the write data (i.e., the journal data) for the new journal entry is larger than the remaining size of the current chunk/segment for journal data area 632, the process proceeds to step 1309. On the other hand, if there is sufficient capacity in the current chunk/segment to store the journal data for the new journal entry, the process proceeds to step 1311.

At step 1309, array controller 110 assigns a new chunk to a segment of journal volume 630 as an area to store the journal data for the new journal entry. The new chunk is selected from free chunks by referring to the chunk usage information 206, and the chunk mapping information 205 and chunk usage information 206 are updated. The segment 692 in journal volume 630 that is selected to store the new chunk typically will be the next unused segment in the journal volume 630, so that segments of the journal volume are filled sequentially from lower-numbered segments to higher-numbered segments.

At step 1310, array controller 110 stores the write data to the new chunk/segment as journal data.

At step 1311, since there was sufficient capacity in the existing chunk/segment, array controller 110 stores the write data to the current chunk/segment as journal data.

At step 1312, array controller 110 updates information about the latest journal entry, such as sequence number and time in journal information 203, and the process ends.

Figure 20:
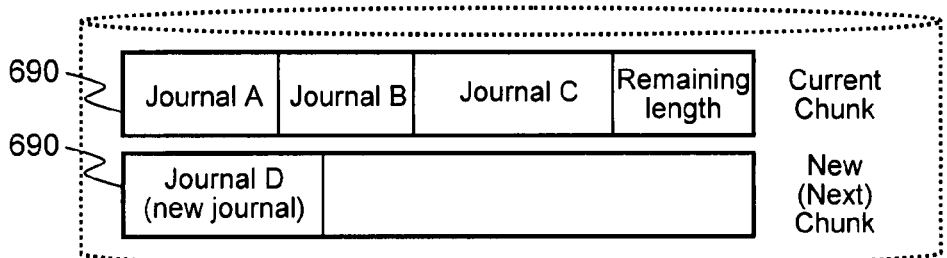
FIG. 20 illustrates a series of journals stored in multiple chunks.

Accordingly, it may be seen that, by the above process, a series of journal entries are stored in multiple chunks/segments, as illustrated in FIG. 20. Using this method, the starting point of a chunk is always the starting point of a journal entry (either journal data or metadata). A new chunk is allocated when the remaining length (capacity) of a current chunk is less than the length (size) of the journal data or metadata, respectively, to be stored.

Process to Diminish Journal Area

Figure 21:
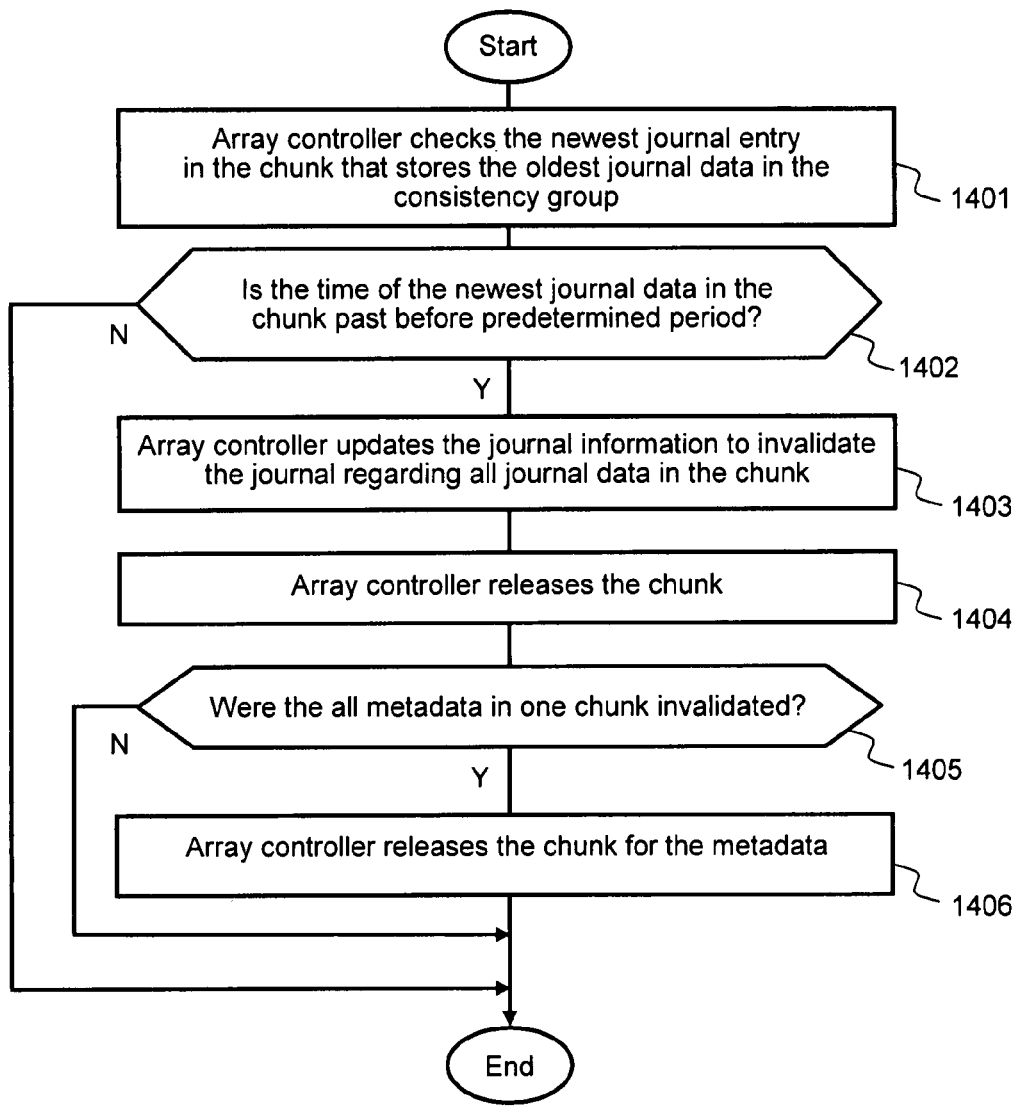
FIG. 21 illustrates a process to minimize the journal area.

FIG. 21 illustrates a process to diminish or minimize the journal area in the storage system in the second embodiments. Array controller 110 may perform the process to diminish the journal area on a regular periodic basis for each consistency group, such as by checking journal volumes in order of sequence number, i.e., chronological order. Accordingly, steps 1401-1406 may be carried out for each journal volume in the storage system.

At step 1401, array controller 110 checks information about the newest journal entry in the chunk that stores the oldest journal data in the consistency group 610. Thus, the array controller checks for the time stamp of the most recent journal entry in the chunk having the oldest journal data to determine the time of that journal entry.

At step 1402, as the result of the inspection in step 1401, if the time of the newest journal data in the chunk is outside (i.e., older than) the specified preservation period entered in field 2016 of information 201, then the data contained in this chunk/segment is no longer needed, so the process proceeds to step 1403 to prepare to release the chunk. However, if the time of the newest journal in the chunk is not older than the specified preservation period, the process ends because the journal data is required to be retained until the predetermined preservation period for the journal data has expired.

At step 1403, array controller 110 updates the information about the oldest journal in journal information 203 to invalidate all journal data in the chunk to be released. Thus, the oldest journal field 2032 for the journal volume 630 of the consistency group is updated to the sequence number and time of the journal entry that immediately follows the journal entry identified in step 1401. This is carried out by determining the first journal entry at the start of the next chunk/segment that follows the chunk to be released.

At step 1404, array controller 110 releases the chunk to be released. This is accomplished by array controller 110 updating chunk mapping information 205 and chunk usage information 206 to make the chunk to be released a free chunk.

At step 1405, array controller 110 checks metadata that was invalidated by release of the chunk released at step 1404. If all metadata in one chunk/segment storing metadata has been invalidated, the process proceeds to step 1406. If not, the process ends, since at least some of the metadata in that chunk/segment still relates to stored journal entries.

At step 1406, array controller 110 releases the chunk for the metadata. This is accomplished by array controller 110 updating chunk mapping information 205 and chunk usage information 206 to make the chunk storing the metadata a free chunk.

The predetermined preservation period (retention period) mentioned above is determined for each consistency group 610 by users or policy, and is set to array controller 110 via management terminal 520. As described in the first embodiments, management terminal 520 may perform inquiry and monitoring about relations between the amount and the period of the journal data. Users may determine the predetermined preservation period by referring to the amount-period information acquired based on monitoring data 522 presented by management terminal 520, as discussed above with reference to FIG. 13 in the first embodiments.

Figure 22:
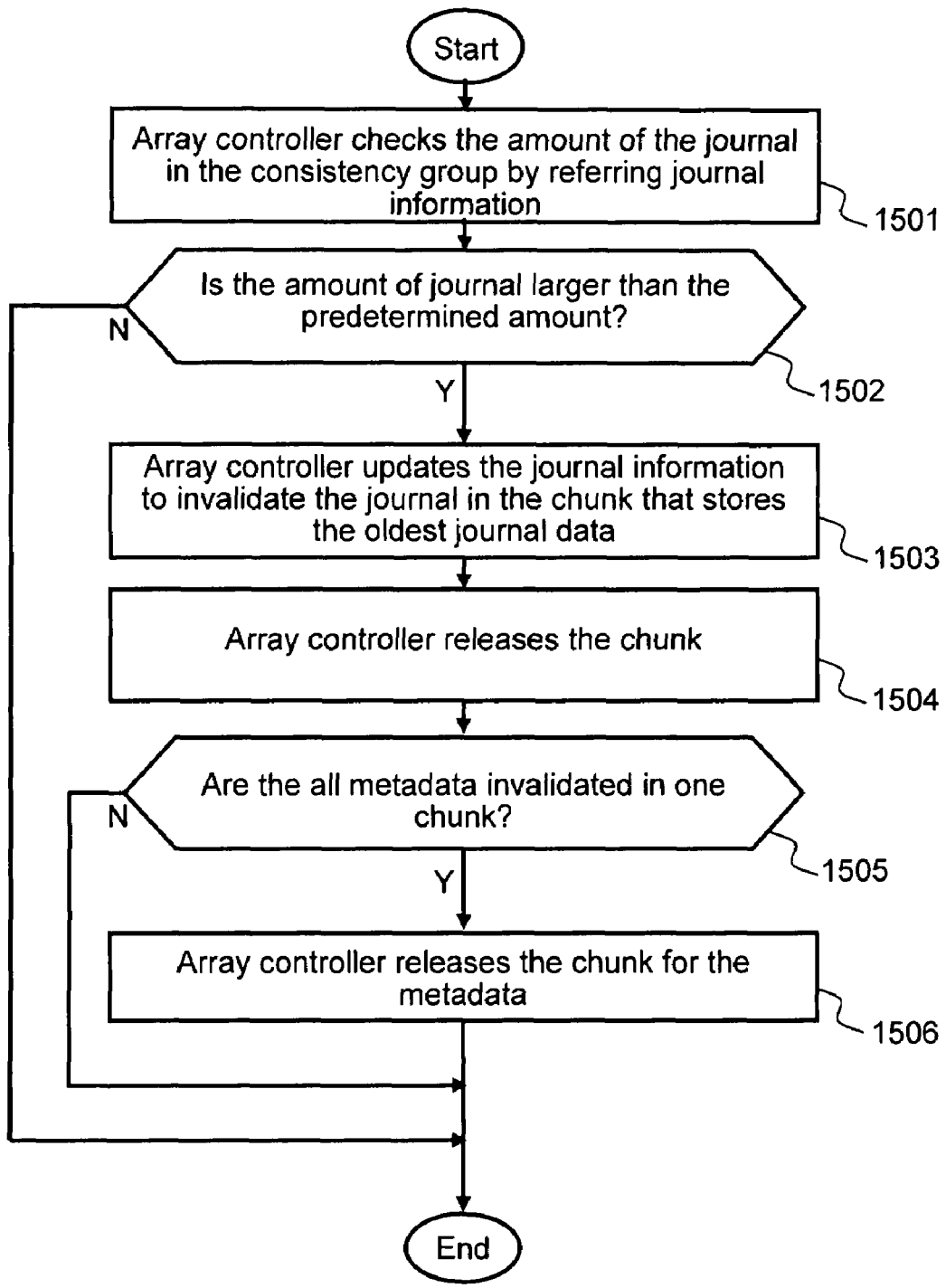
FIG. 22 illustrates another process to minimize the journal area.

FIG. 22 illustrates another method to diminish journal area. In this process, the amount of the journal is used as a condition to delete journal entries and diminish the journal area, instead of the preservation period described in FIG. 21 and FIG. 15. With this process, a user can diminish the journal area from the perspective of the amount of journal data.

At step 1501, array controller 110 checks the amount of the journal data in the consistency group. One technique for accomplishing this is by determining the number of chunks assigned to the journal volume 630 using chunk mapping information 205, and then multiplying the number of chunks used for the journal volume by the set storage capacity of an individual chunk.

At step 1502, following the inspection in step 1501, the array controller determines whether the amount of journal data is larger than a predetermined amount set by a user, or set according to a predetermined policy. If the amount of journal data exceeds the predetermined amount, the process goes to step 1503. If the amount of journal data does not exceed the predetermined amount, the process ends.

At step 1503, array controller 110 updates the journal information to invalidate the journal in the chunk that stores the oldest journal data. Thus, the oldest journal field 2032 for the journal volume 630 of the consistency group is updated to the sequence number and time of the first journal entry in the second-to-oldest chunk.

At step 1504, array controller 110 releases the oldest chunk by updating chunk mapping information 205 and chunk usage information 206 to make the oldest chunk a free chunk.

At step 1505, array controller 110 checks metadata that was invalidated by release of the oldest chunk released at step 1504. If all metadata in one chunk/segment storing metadata has been invalidated, the process proceeds to step 1506. If not, the process ends, since at least some of the metadata in that chunk/segment containing metadata still relates to stored journal entries.

At step 1506, array controller 110 releases the chunk for the metadata. This is accomplished by array controller 110 updating chunk mapping information 205 and chunk usage information 206 to make the chunk storing the metadata a free chunk.

The above steps are repeated periodically for each consistency group or individual journal volume. Moreover, as described in the first embodiments, both of above processes can include steps for checking the time of the latest snapshot. If there would be no snapshot that is older than the oldest journal after deletion of journal data, the deletion should not be performed. Thus, by the system and the processes described above, flexible and automatic adjustment of the journal area is carried out, and the management of the journal area is simplified.

Third Embodiments—Process of Generating Journal

Figure 23:
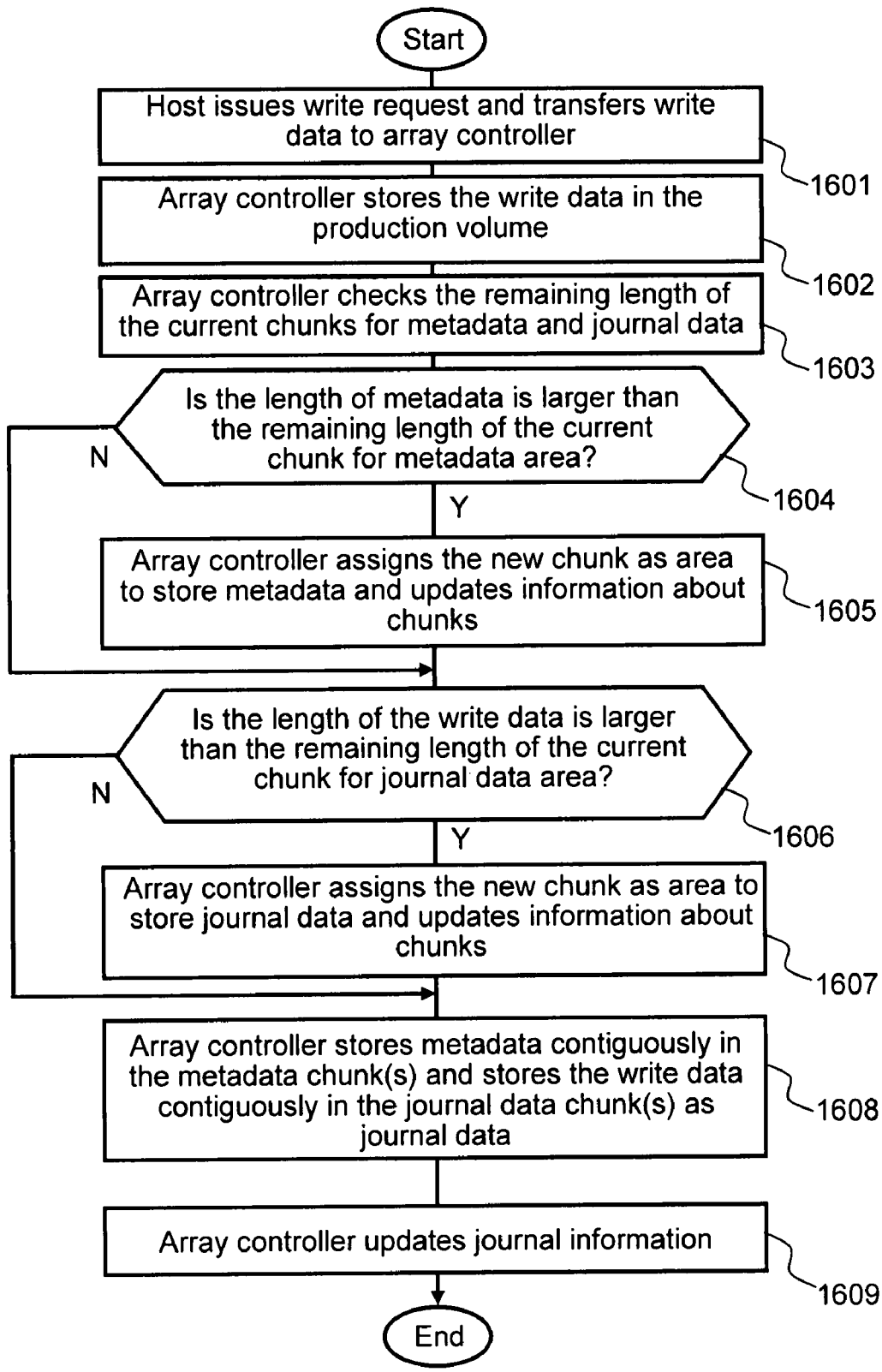
FIG. 23 illustrates a process of generating a journal in the third embodiments of the invention.

FIG. 23 illustrates a process of generating a journal in the third embodiments. The system configuration of the third embodiments may be the same as described above for the second embodiments. In the third embodiments, journal entries are able to be stored across chunks, such that a portion of a journal entry may be stored in a first chunk, and the remainder of the journal entry may be stored in a second chunk, thereby reducing wasted storage capacity. The process includes steps 1601-1609, as described below.

At step 1601, host 500 issues a write request and transfers write data to array controller 110.

At step 1602, array controller 110 stores the write data in production volume 620 according to the write request.

At step 1603, array controller 110 checks the remaining unused capacity (length) of the current chunk for containing metadata and the remaining unused capacity of the current chunk for containing journal data.

At step 1604, as a result of the inspection in step 1603, if the size of the metadata of the new journal entry is larger than the remaining size of the current chunk for metadata area, the process proceeds to step 1605. If not, the process proceeds to step 1606.

At step 1605, array controller 110 assigns a new chunk as an area to store metadata from the free chunks by updating chunk mapping information 205 and chunk usage information 206.

At step 1606, as the result of the inspection in step 1603, if the size of the write data (i.e. the journal data) for the new journal entry is larger than the remaining size of the current chunk be used to store new journal data, the process proceeds to step 1607. If not, the process proceeds to step 1608.

At step 1607, array controller 110 assigns a new chunk as an area to store new journal data from the free chunks by updating chunk mapping information 205 and chunk usage information 206.

At step 1608, array controller 110 stores the new metadata for the new journal entry contiguously in the chunk(s) for storing metadata and stores the write data for the new journal entry as new journal data contiguously in the chunk(s) for storing journal data, such that if the entry is too large for the remaining capacity of the chunk, a portion of the entry is stored in the remaining capacity, with the remaining portion of the entry being stored contiguously in the newly allocated chunk.

At step 1609, array controller 1 10 updates information about the latest journal entry in journal information 203.

Figure 24:
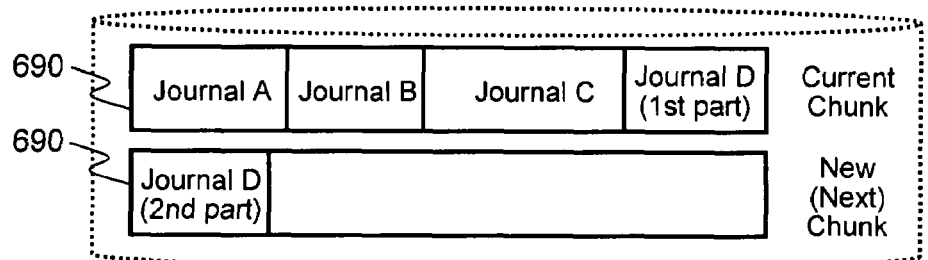
FIG. 24 illustrates a series of journals stored in multiple chunks.

By the above process, a series of journals are stored in multiple chunks as illustrated in FIG. 24. Thus, one journal can be divided into multiple parts and stored across multiple chunks, so that a first part of the journal data or metadata is stored in a portion of a first chunk, and a second part of the journal data or metadata is stored in a second chunk.

Process to Diminish Journal Area

Figure 25:
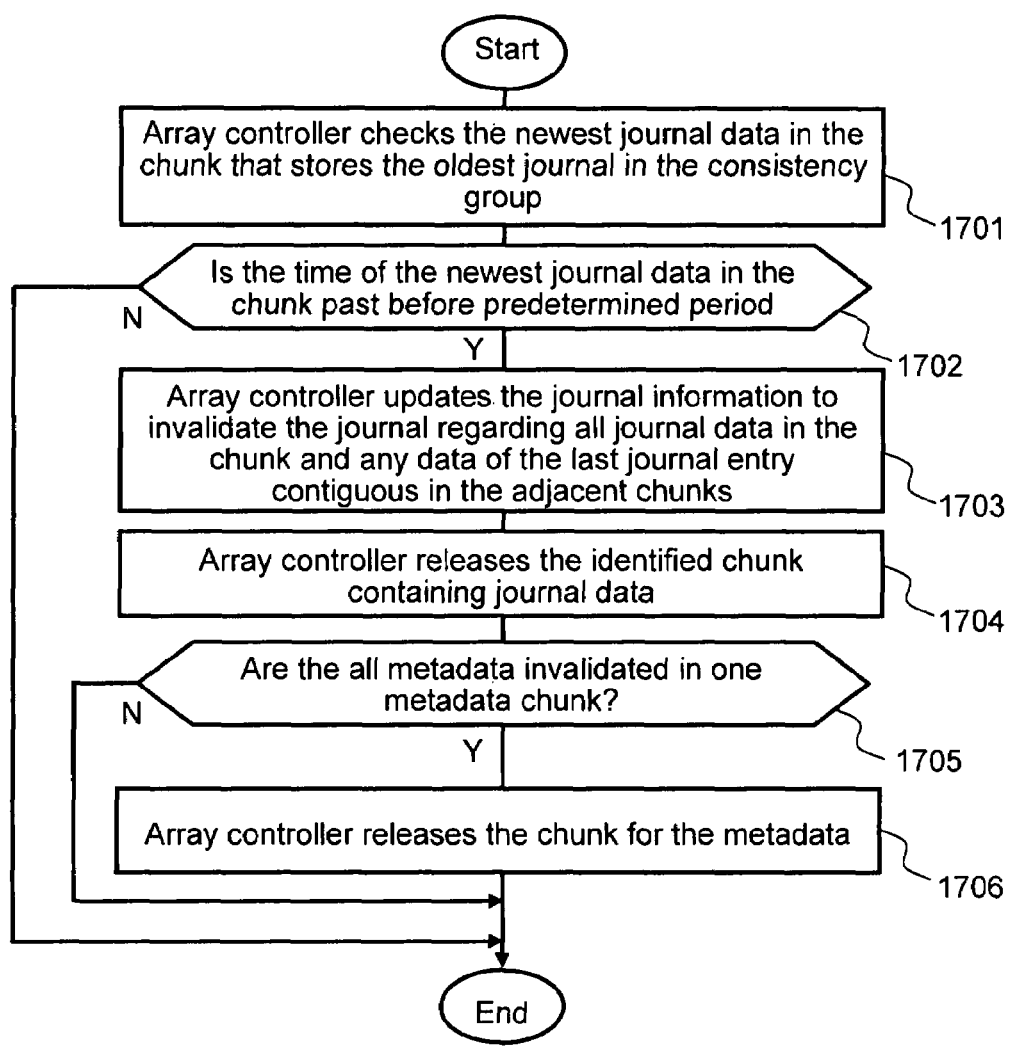
FIG. 25 illustrates a process to diminish the journal area in the third embodiments of the invention.

FIG. 25 illustrates a process to diminish or minimize the journal area in the third embodiments. Array controller 110 may perform the process regularly for each consistency group by checking journals in order of sequence number, i.e. chronological order. Steps 1701-1702 and 1704-1706 of this process are similar to steps 1401-1402 and 1404-1406 of the process described in FIG. 21 in the second embodiments, and thus, step 1703 is different.

At step 1701, array controller 110 checks information about the newest journal entry in the chunk that stores the oldest journal data in the consistency group 610. Thus, the array controller checks for the time stamp of the most recent journal entry in the chunk having the oldest journal data to determine the time of that journal entry.

At step 1702, as the result of the inspection in step 1401, if the time of the newest journal data in the chunk is outside (i.e., older than) the specified preservation period entered in field 2016 of information 201, then the data contained in this chunk/segment is no longer needed, so the process proceeds to step 1703 to prepare to release the chunk. However, if the time of the newest journal in the chunk is not older than the specified preservation period, the process ends because the journal data is required to be retained until the predetermined preservation period for the journal data has expired.

At step 1703, array controller 110 updates the information about the oldest journal in journal information 203 to invalidate all journal data in the chunk to be released and any contiguous journal data for the last journal entry of the chunk that may be located in the adjacent (subsequent) chunks. Thus, the time and sequence number for next journal in the next chunk is entered in the oldest journal field 2032.

At step 1704, array controller 110 releases the chunk to be released. This is accomplished by array controller 110 updating chunk mapping information 205 and chunk usage information 206 to make the chunk to be released a free chunk.

At step 1705, array controller 110 checks metadata that was invalidated by release of the chunk released at step 1404. If all metadata in one chunk/segment storing metadata has been invalidated, the process proceeds to step 1706. If not, the process ends, since at least some of the metadata in that chunk/segment still relates to stored journal entries.

At step 1706, array controller 110 releases the chunk for the metadata. This is accomplished by array controller 110 updating chunk mapping information 205 and chunk usage information 206 to make the chunk storing the metadata a free chunk.

Thus, it may be seen that the invention provides flexible and automatic adjustment of a journal area and simplifies management of the journal area. While the invention has been described in the environment of an "after" journal (i.e., where the journal contains the data as it is after being updated), the invention may also be carried out in the environment of a "before" journal (i.e., where the journal contains the data as it existed before the update was conducted), as described, e.g., in U.S. Pat. No. 7,062,628, to Takashi Amano, filed Sep. 28, 2004, the disclosure of which is incorporated herein by reference. Thus, in the case of a "before" journal, as the journal area grows, the journal area may be managed as described in the three embodiments discussed above. Further, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the above description has been made in an illustrative fashion, and not a restrictive one. Accordingly, the scope of the invention should properly be determined with reference to the appended claims, along with the full range of equivalents to which such claims are entitled.

What is claimed is:

1. A method of operating a storage system, comprising:
receiving first write data for storage to a first volume in the storage system;
creating first metadata for the first write data, said first metadata including a first time and a first sequence number;
storing, as a journal entry in a journal volume, the first metadata and a copy of the first write data as first journal data, said first journal data having a first storage size;
accumulating the first storage size for each journal entry over a predetermined time period, so that total amounts of journal data for each predetermined time period of a plurality of predetermined time periods are determined and stored as the journal volume is updated;
receiving at a computer in communication with the storage system the total amounts of journal data for a plurality of said predetermined time periods;
presenting to a user of the computer a relation between the total amounts of journal data and said plurality of predetermined time periods over a specified period of time;
comparing the first time of the journal entry with start times of the predetermined time periods assigned for managing journal entries in the journal volume;
adding the first storage size of the first journal data to the total amount of journal data for a current time period when the first time is before a start time of a next time period following the current time period; and
setting the next time period as a new current time period and setting the first storage size of the first journal data as a new current total amount of journal data for the next time period when the first time is after the start time of the next time period.

2. A method according to claim 1, further comprising:
maintaining information on said predetermined time periods in a table that includes a start time of each predetermined time period, an oldest sequence number in each predetermined time period, and the total amount of journal data generated for each predetermined time period.

3. A method according to claim 1, further including steps of referring to the presented relation to determine a new size of the journal volume; and
instructing the storage system to change the size of the journal volume based on the determined new size.

4. A method of operating a storage system, comprising:
receiving first write data for storage to a first volume in the storage system;
creating first metadata for the first write data, said first metadata including a first time and a first sequence number;

storing, as a journal entry in a journal volume, the first metadata and a copy of the first write data as first journal data, said first journal data having a first storage size;

accumulating the first storage size for each journal entry over a predetermined time period, so that total amounts of journal data for each predetermined time period of a plurality of predetermined time periods are determined and stored as the journal volume is updated;

receiving at a computer in communication with the storage system the total amounts of journal data for a plurality of said predetermined time periods;

presenting to a user of the computer a relation between the total amounts of journal data and said plurality of predetermined time periods over a specified period of time;

referring to the presented relation to determine a new size of the journal volume;

instructing the storage system to change the size of the journal volume based on the determined new size;

determining whether an oldest journal entry remaining in the journal volume will be older than a newest snapshot of said first volume prior to carrying out changing the size of the journal volume; and rejecting an instruction to change the size of the journal volume when a determination is made that the oldest journal entry remaining in the journal volume will not be older than the newest snapshot.

5. A method of operating a storage system, comprising:

receiving first write data for storage to a first volume in the storage system;

creating first metadata for the first write data, said first metadata including a first time and a first sequence number;

storing, as a journal entry in a journal volume, the first metadata and a copy of the first write data as first journal data, said first journal data having a first storage size;

accumulating the first storage size for each journal entry over a predetermined time period, so that total amounts of journal data for each predetermined time period of a plurality of predetermined time periods are determined and stored as the journal volume is updated;

receiving at a computer in communication with the storage system the total amounts of journal data for a plurality of said predetermined time periods;

presenting to a user of the computer a relation between the total amounts of journal data and said plurality of predetermined time periods over a specified period of time;

referring to the presented relation to determine a new size of the journal volume;

instructing the storage system to change the size of the journal volume based on the determined new size;

determining whether an oldest journal entry remaining in the journal volume will be older than a newest snapshot of said first volume prior to carrying out changing the size of the journal volume; and carrying out an instruction to change the size of the journal volume when a determination is made that the oldest journal entry remaining in the journal volume will be older than the newest snapshot.

6. A method according to claim 5, further including steps of changing the size of the journal volume by deleting journal information for journal entries older than the newest snapshot; and releasing surplus capacity of the journal volume to another use by the storage system.

7. A method according to claim 5, further including steps of maintaining information on said predetermined time periods in a table that includes a start time of each predetermined time period, an oldest sequence number in each predetermined time period, and the total amount of journal data generated for each predetermined time period.

8. An information system comprising:

a storage system, said storage system including an array controller in communication with a plurality of disk drives, said array controller configured to present a plurality of volumes, whereby data stored to said volumes is stored to physical locations on said disk drives, said plurality of volumes including a first volume for storing write data including a first write data, and a journal volume; and one or more host computers in communication with said storage system via a network, said one or more host computers configured to write the first write data to said first volume, wherein when said storage system receives the first write data, the storage system creates a first metadata for said first write data, the first metadata including a first time and a first sequence number, wherein said storage system stores, as a journal entry in said journal volume, said first metadata and a copy of said first write data as first journal data, said first journal data having a first storage size;

wherein said storage system compares the first time of the journal entry with start times of predetermined time periods assigned for managing journal entries to the journal volume, wherein said storage system adds the first storage size of the first journal data to a total amount of journal data for a current time period when the first time is before a start time of a next time period following the current time period, wherein said storage system sets the next time period as a new current time period and sets the first storage size of the first journal data as a new current total amount of journal data for the next time period when the first time is after the start time of the next time period, wherein the total amounts of journal data for each predetermined time period are determined and stored as the journal volume is updated.

9. A system according to claim 8, further comprising a management computer in communication with the storage system, wherein the management computer receives total amounts of journal data for a plurality of said predetermined time periods, and wherein a user of the management computer is presented with a relation between the total amounts of journal data and said plurality of predetermined time periods over a specified period of time.

10. A system according to claim 9, further comprising wherein the presented relation is referred to for determining a new size of the journal volume; and wherein the storage system is instructed to change the size of the journal volume based on the determined new size.

11. A system according to claim 10, further comprising wherein the storage system determines whether an oldest journal entry remaining in the journal volume will be older than a newest snapshot of said first volume prior to carrying out changing the size of the journal volume; and wherein the storage system rejects an instruction to change the size of the journal volume when a determination is made that the oldest journal entry remaining in the journal volume will not be older than the newest snapshot.

12. A system according to claim 10, further comprising
wherein the storage system determines whether an oldest journal entry remaining in the journal volume will be older than a newest snapshot of said first volume prior to carrying out changing the size of the journal volume; and
wherein the storage system carries out an instruction to change the size of the journal volume when a determination is made that the oldest journal entry remaining in the journal volume will be older than the newest snapshot.

13. A system according to claim 12, further comprising
wherein the storage system changes the size of the journal volume by deleting journal information for journal entries older than the newest snapshot; and
wherein the storage system releases surplus capacity of the journal volume to another use by the storage system.

14. A system according to claim 8, further comprising
wherein the storage system maintains information on said predetermined time periods in a table that includes a start time of each predetermined time period, an oldest sequence number in each predetermined time period, and a total amount of journal data generated for each predetermined time period.

15. A method of operating a storage system, comprising:
receiving write data for storage to a first volume in the storage system;
creating metadata for the write data, said metadata including a first time and a sequence number;
storing the metadata and a copy of the write data as journal data to a journal volume, said journal volume being composed of a plurality of logical segments, said storage system being configured to allocate a chunk of physical storage area to each segment individually on an as-needed basis by checking a capacity remaining in a current chunk to determine if said capacity in said current chunk is sufficient to receive said journal data or said metadata and allocating a new chunk of physical storage area to a next segment in the journal volume when said current chunk is determined to have insufficient capacity;
determining whether all journal data in an existing chunk containing oldest journal data can be deleted; and
releasing the existing chunk from the journal volume when all the journal data contained in the existing chunk can be deleted.

16. A method according to claim 15, further including steps of
determining whether all journal data in an existing chunk containing oldest journal data can be deleted is carried out by determining whether the time of a newest journal data in the existing chunk is before a predetermined period of time, and
determining that all the journal data contained in the existing chunk can be deleted when the time of the newest journal data in the existing chunk is before the predetermined period of time.

17. A method according to claim 15, further including steps of
determining whether all journal data in an existing chunk containing oldest journal data can be deleted is carried out by determining whether the size of the journal volume has exceeded a predetermined size, and
determining that all the journal data contained in the existing chunk can be deleted when the size of the journal volume has exceeded the predetermined size.

18. A method according to claim 15, further including steps of
determining whether all metadata contained in a metadata chunk has been invalidated by release of said existing chunk; and
releasing said metadata chunk when all metadata contained in the metadata chunk has been invalidated by the release of said existing chunk.

19. A method according to claim 15, further including steps of
checking a capacity remaining in a current chunk to determine if said capacity in said current chunk is sufficient to receive said journal data;
allocating a new chunk of physical storage area to a next segment in the journal volume when said current chunk is determined to have insufficient capacity; and
storing a first portion of said journal data to said current chunk and storing a second portion of said journal data to said new chunk.

20. A method according to claim 18, further including steps of
prior to releasing the existing chunk from the journal volume, updating journal information to invalidate journal data in the existing chunk and in any chunks containing a portion of latest journal data stored in the existing chunk.

* * * * *